No. 701,846. Patented June 10, 1902.
G. F. CONNER.
BAND CUTTER FOR THRESHING MACHINES.
(Application filed July 15, 1901.)
(No Model.) 2 Sheets—Sheet 2.
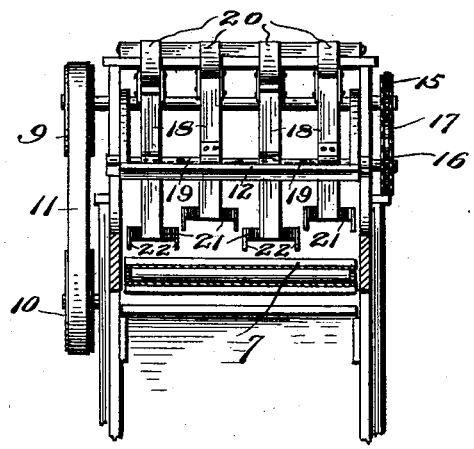
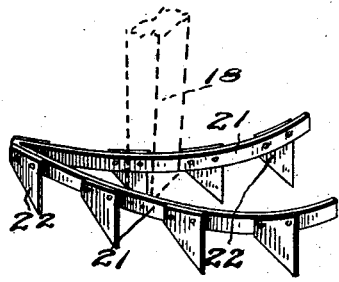
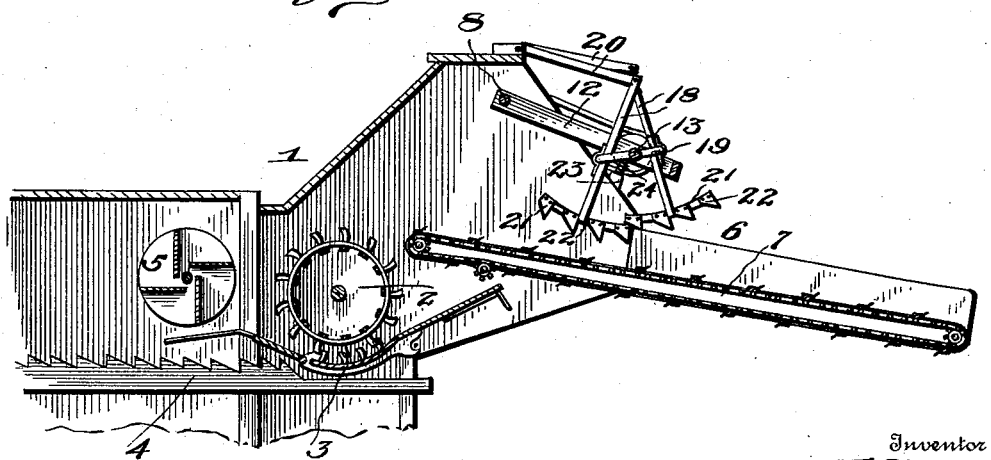
Inventor
George F. Conner
Witnesses
By
Attorneys

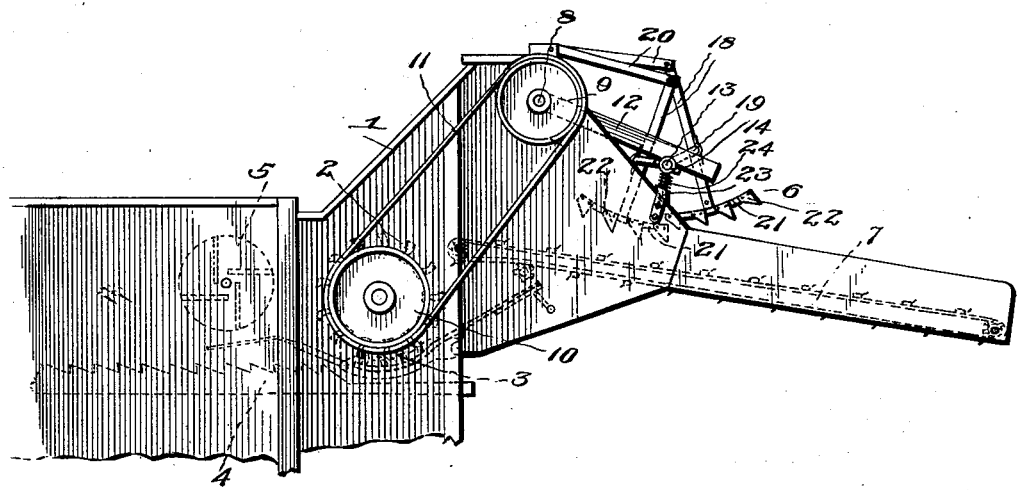

UNITED STATES PATENT OFFICE.

GEORGE F. CONNER, OF PORT HURON, MICHIGAN.

BAND-CUTTER FOR THRESHING-MACHINES.

SPECIFICATION forming part of Letters Patent No. 701,846, dated June 10, 1902.

Application filed July 15, 1901. Serial No. 68,416. (No model.)

*To all whom it may concern:*

Be it known that I, GEORGE F. CONNER, a citizen of the United States, residing at Port Huron, in the county of St. Clair and State of Michigan, have invented certain new and useful Improvements in Band-Cutters for Threshing-Machines; and I do declare the following to be a full, clear, and exact description of the invention, such as will enable others skilled in the art to which it appertains to make and use the same.

This invention relates to improvements in band-cutters for threshing-machines.

The object of the invention is to provide a band-cutter which will readily adjust itself to the thickness of the straw and will spread and loosen up the straw in an effective manner.

With this and other objects in view the invention consists of certain novel features of construction, combination, and arrangement of parts, as will be hereinafter more fully described, and particularly pointed out in the appended claim.

In the accompanying drawings, Figure 1 is a side elevation of the band-cutter and feeder and the front end of a threshing-machine, the bundle-conveyer, the band-cutter, the cylinder, its concave, the straw-carrier, and associated parts appearing in dotted lines. Fig. 2 is a top plan view of the same. Fig. 3 is a cross-section through the feeder-frame, showing the band-cutting devices in front elevation. Fig. 4 is a vertical longitudinal section through the parts shown in Fig. 1. Fig. 5 is a detail view of the spreader and cutters.

Referring now more particularly to the drawings, the numeral 1 denotes the front end of a threshing-machine or separator. 2 denotes the threshing-cylinder, and 3 its concave.

4 denotes the straw carrier or shaker, arranged below or at the rear of the concave, and 5 denotes the beater, located above the carrier or shaker 4.

6 denotes the self-feeder, connected to the front end of the threshing-machine and comprising in its construction an endless bundle-conveyer 7. The feeder may be of any well-known or approved construction and driven by any preferred type of mechanism.

8 denotes a drive-shaft provided at one end with a band-wheel 9, which is connected to a similar wheel 10 by a drive-belt 11. The wheel 10 is fixed to the shaft of the threshing-cylinder, which is driven from any suitable source of power.

12 denotes a link or swinging frame journaled upon the shaft 8 to rise and fall, and 13 a crank-shaft journaled in bearings 14 upon the outer free end of said link or frame. Sprocket-wheels 15 16 are respectively fixed upon the drive and crank shafts and are connected by a chain 17, whereby said crank-shaft is driven.

18 denotes crank-arms journaled intermediately upon the cranks 19 of the shaft 13 and connected at their upper ends by links 20 with the front end of the machine 1, and 21 denotes holders connected to the lower ends of the crank-arms 18 and carrying the band-cutting knives 22. Each holder 21 consists of a V-shaped or wedge-shaped spreader-frame, to the opposite sides of which the knives 22 are attached, so that a wedging action will be exerted upon the bundle after the bands have been cut to loosen up and spread out the straw.

23 denotes stop-brackets mounted upon the frame 1 and carrying cushioning-springs 24, which take up the jar of contact from off the frame 12 and crank-arms 18 when they drop down after passing over a thick bundle.

In operation the bundles are fed upon the bundle-conveyer 7, which moves them rearwardly under the band-cutters. The action of the cranks 19 and the guide-links 20 causes the crank-arms 18 to move the holders 21 in an elliptical path, the major axis of which is parallel with the path of travel of the bundles, thereby increasing the range of cutting movement of the knives and preventing the knives from skipping the bands, as they are liable to do when moved in a circular path. As the holders carrying the knives or cutters are moved by the crank-arms the link or swinging frame 12 plays up and down to adjust the knives to the thickness of the bundle passing beneath them, the jar of impact upon the dropping down of said link or frame being taken up by the cushioning-springs 24 upon the stops 23, thus relieving the crank-arms of the strain which would otherwise be thrown thereon. The cutters by being of V or wedge formation are adapted upon the cutting of the bands to move through the straw and to exert a wedging action thereon, spreading and loosening up the straw in the most effective manner and preventing it from passing in a solid or compact mass to the threshing-cylinder, whereby the straw is placed in condition to be thoroughly threshed.

From the foregoing description, taken in connection with the accompanying drawings, the construction, operation, and advantages of the invention will be readily understood without requiring an extended description. It will be readily seen that the device is exceedingly useful for the purpose for which it is designed and is comparatively inexpensive of production.

Various changes in the form, proportion, and minor details of construction may be resorted to without departing from the principle or sacrificing any of the advantages of this invention. For instance, I may employ cranks of any preferred form and arrangement instead of the crank-shaft for operating the crank-arms and use a series of independent links for supporting said cranks and crank-arms, as will be readily understood.

Having thus described my invention, what I claim as new, and desire to secure by Letters Patent, is—

The combination with the thresher-frame, the thresher-cylinder and shaft, and the bundle-conveyer, of a drive-shaft mounted in the frame and in gear with said thresher-shaft, a frame mounted to swing upon the drive-shaft, a crank-shaft journaled in the swinging frame, gearing between the drive and crank shafts, crank-arms mounted intermediately upon the crank-shaft, V-shaped band-cutting and spreading devices provided with cutting-knives and carried by the lower ends of said crank-arms, links connecting the upper ends of the crank-arms to the thresher-frame to control the action of said arms to swing said cutting and spreading devices in an elliptical path whose major axis lies parallel with the path of travel of the straw, and cushioning-stops upon the frame to take up the jar of impact upon the downward movement of the frame, thereby relieving the parts from strain, substantially as set forth.

In testimony whereof I have hereunto set my hand in presence of two subscribing witnesses.

GEORGE F. CONNER.

Witnesses:
G. R. HAIGH,
H. E. HALL.